US010853847B2

(12) United States Patent
Luo et al.

(10) Patent No.: US 10,853,847 B2
(45) Date of Patent: Dec. 1, 2020

(54) METHODS AND SYSTEMS FOR NEAR REAL-TIME LOOKALIKE AUDIENCE EXPANSION IN ADS TARGETING

(71) Applicant: Yahoo Holdings, Inc., Sunnyvale, CA (US)

(72) Inventors: Haiyan Luo, San Jose, CA (US); Datong Chen, Santa Clara, CA (US); Zhen Xia, Mountain View, CA (US); Shiyong Cheng, Sunnyvale, CA (US); Yi Mao, Sunnyvale, CA (US); Shu Zhang, Santa Clara, CA (US); Jiayi Wen, Sunnyvale, CA (US); Xiaojiang Cheng, Fremont, CA (US); Herve Marcellini, Menlo Park, CA (US)

(73) Assignee: Oath Inc., New York, NY (US)

( * ) Notice: Subject to any disclaimer, the term of this patent is extended or adjusted under 35 U.S.C. 154(b) by 415 days.

(21) Appl. No.: 15/154,613

(22) Filed: May 13, 2016

(65) Prior Publication Data

US 2017/0330239 A1  Nov. 16, 2017

(51) Int. Cl.
| | |
|---|---|
| G06Q 30/02 | (2012.01) |
| G06F 9/46 | (2006.01) |
| G06N 20/20 | (2019.01) |
| G06N 20/10 | (2019.01) |
| H04L 29/08 | (2006.01) |
| H04L 12/803 | (2013.01) |

(52) U.S. Cl.
CPC ........... *G06Q 30/0269* (2013.01); *G06F 9/46* (2013.01); *G06N 20/10* (2019.01); *G06N 20/20* (2019.01); *G06Q 30/0277* (2013.01); *H04L 47/125* (2013.01); *H04L 67/306* (2013.01)

(58) Field of Classification Search
CPC ............ G06Q 30/0269; G06Q 30/0277; H04L 67/306
See application file for complete search history.

(56) References Cited

U.S. PATENT DOCUMENTS

| 9,130,988 B2 * | 9/2015 | Seifert ............... H04L 63/1416 |
| 2010/0223213 A1 * | 9/2010 | Su ........................ G06F 9/5066 706/12 |
| 2014/0280549 A1 * | 9/2014 | Rajan ..................... H04L 67/22 709/204 |

(Continued)

OTHER PUBLICATIONS

Ullman, J. (n.d.). Mining of Massive Datasets. Chapter 3 All Pages. Retrieved Jul. 20, 2018, from http://mmds.org/ (Year: 2015).*

(Continued)

*Primary Examiner* — Calvin L Hewitt, II
*Assistant Examiner* — Dennis G Keritsis
(74) *Attorney, Agent, or Firm* — Cooper Legal Group, LLC

(57) ABSTRACT

A signature matrix is used to test each online event for inclusion of a user in a pre-generated lookalike audience. Locality Sensitive Hashing is used to compile the signature matrix to dramatically reduce memory storage requirements and processing time for each received online event. A technique of producing incremental signature matrices between generation of the full signature matrix helps to enable near-real time performance in processing each received event to see if a user associated with that event should be added to one of the lookalike audiences pre-generated by advertiser.

20 Claims, 5 Drawing Sheets

(56) References Cited

U.S. PATENT DOCUMENTS

2017/0140283 A1* 5/2017 Cheng .................. G06N 20/00

OTHER PUBLICATIONS

Tzeng et al., Split-and-Combine Singular Value Decomposition for Large-Scale Matrix, Jan. 22, 2013, Hindawi Publishing Corporation, Journal of Applied Mathematics Volumn 2013 (Year: 2013).*
Ullman, J. (n.d.). Mining of Massive Datasets. Chapter 3 All pages. Retrieved Jul. 20, 2018, from http://mmds.org/ (Year: 2015) (Year: 2015).*
Liu, B., Zhao, Y., Zhong, X., Liang, Z., & Feng, B. (2013). A Novel Thread Partitioning Approach Based on Machine Learning for Speculative Multithreading. 2013 IEEE 10th International Conference on High Performance Computing and Communications. doi: 10.1109/hpcc.and.euc.2013.119 (Year: 2013).*
Author unknown, White Paper—3 Keys to Success with Look-Alike Modeling, 6pgs., Sep. 2012.
Aly et al., Web-Scale User Modeling for Targeting, www 2012-Industrial Track, 10pgs., Apr. 16-20, 2012.
Tank et al., The Hadoop Distributed File System, International Journal of Computer, International Journal of Computer (IJC) vol. 8, No. 1, ISSN 2307-4531, 8pgs, 2013.
Fuxman et al., Enabling Direct Interest-Aware Audience Selection, 10pgs., CIKM, Oct. 29-Nov. 2, 2012.
Shvachko et al., The Hadoop Distributed File System, IEEE, 10pgs., 2016.
Facebook for Business, How Do I Create a Lookalike Audience? |Facebook Help Center, 2pgs., downloaded Feb. 11, 2016.
Facebook for Business, How Do I Create a Lookalike Audience? |Facebook Help Center, 6pgs., downloaded Feb. 11, 2016.
Luo et al., Method and System of Leader based Database Loading for Storm based High throughput NRT systems., An IP.com Prior Art Database Technical Disclosure, 3pgs., Oct. 6, 2015.
Author unknown, Reach People Similar to Your Existing Audiences, AdWords Help, 4pgs., downloaded Feb. 11, 2016.
Shen et al., Effective Audience Extension in Online Advertising, 12pgs., Aug. 10-13, 2015.
Author unknown, 3 Keys to Success with Look-Alike Modeling, 2pgs., downloaded Feb. 11, 2016.
Facebook for Business, How Do I Create a Lookalike Audience? |Facebook Help Center, 1 pg., downloaded Feb. 11, 2016.
Ramesh et al., Audiences Segment Expansion Using Distributed In-Database K-Means Clustering, ADKDD, ACM 978-1-4503-2323-9, 9pgs., Aug. 11, 2013.

* cited by examiner

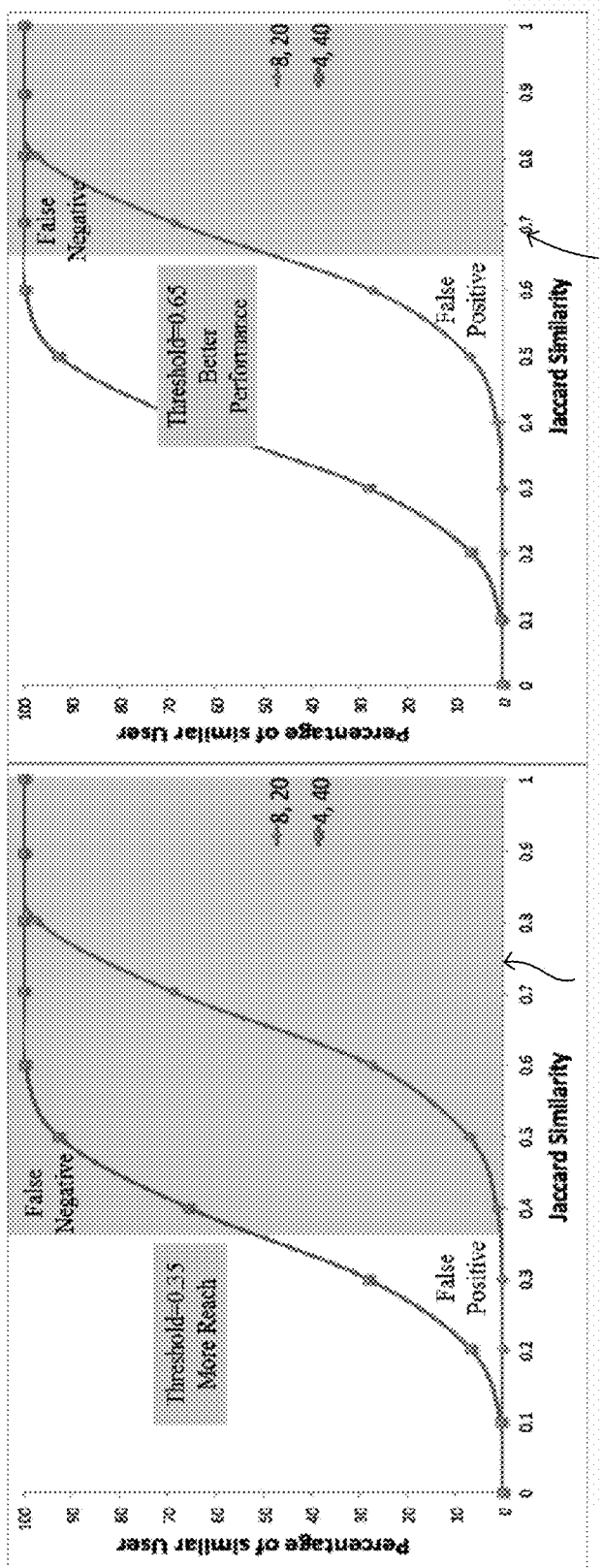

METHODS AND SYSTEMS FOR NEAR REAL-TIME LOOKALIKE AUDIENCE EXPANSION IN ADS TARGETING

TECHNICAL FIELD

This disclosure relates generally to data processing systems and methods. More particularly, this relates to methods and systems that enable near real-time lookalike audience expansion in advertisement targeting while reducing computational cost and memory storage capacity.

BACKGROUND

Internet technology is affecting widespread areas of life and business. The Internet improves access to promoters of goods and services by end users and improves access to those end users by the promoters of goods and services. As this channel for communication has grown, so has the amount of data processed by network devices grown. Such large amounts of data, as well as the growing physical extent of the Internet, have made it increasingly difficult for interested sellers and end users to connect. Conventional techniques for processing data produced by online activity have required tremendous computational cost and a substantial memory storage capacity. In fact, some processing of data produced by routine Internet activities can take days or weeks to complete because of the sheer volume of data involved. This is incompatible with other network processes that occur nearly instantaneously, such as providing requested search results to an end user or redirecting a web browser to a desired web site after a click through. At the same time, the need for promoters and end users to make such connections has been growing as well. Improvements and automation in the connection between parties on the Internet will further enhance the opportunities for these parties to interact.

BRIEF DESCRIPTION OF THE DRAWINGS

FIG. 5 is a diagram illustrating a performance evaluation comparison of lookalike audience expansion modelling used in a real-time ads targeting platform.

DETAILED DESCRIPTION

Figure 1:
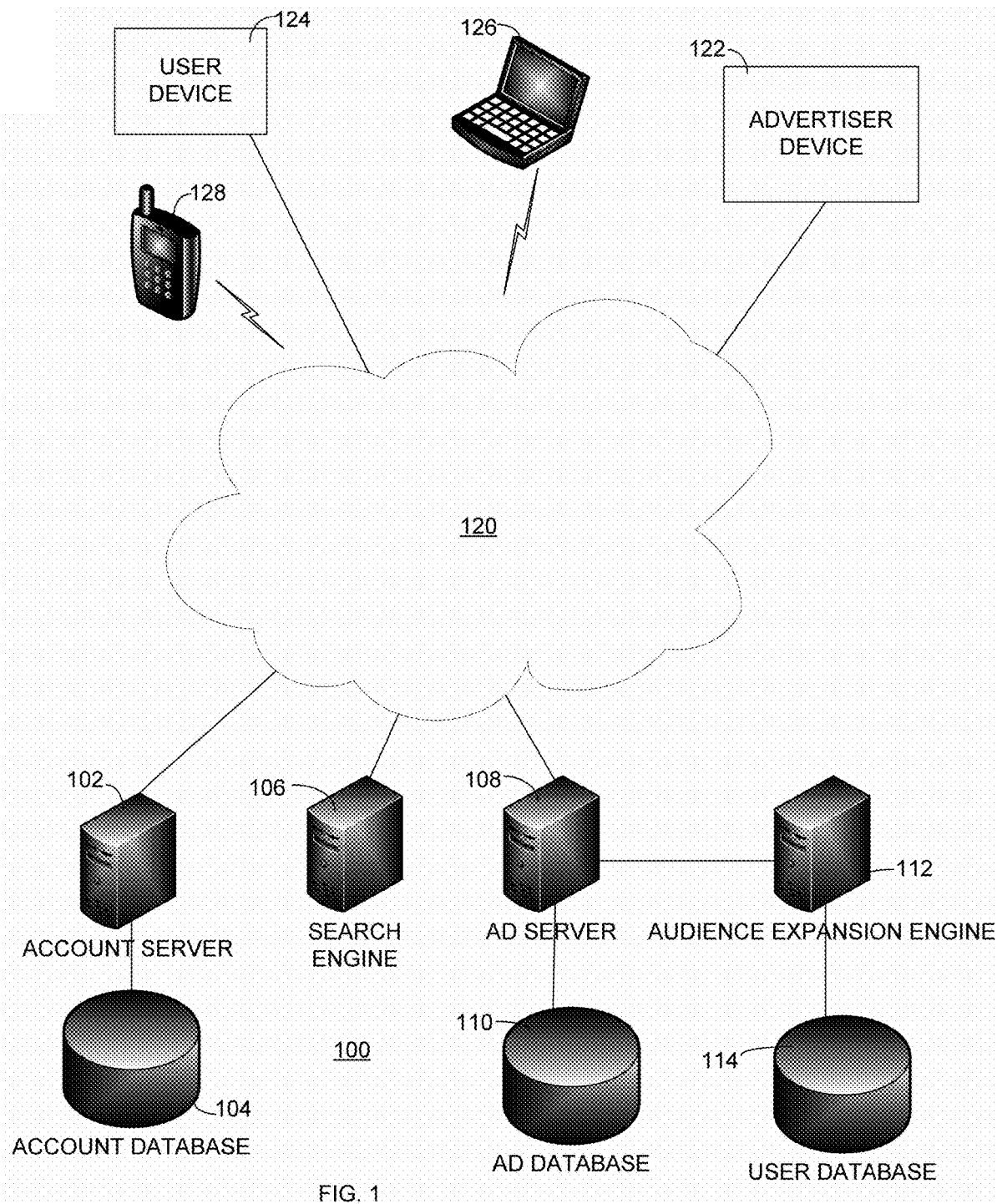
FIG. 1 is a block diagram of an exemplary online information system.

Systems and methods in accordance with the disclosure herein permit lookalike audience expansion for advertisement targeting in online systems. Expanding an advertising audience to include a lookalike audience allows advertisers to identify and target people who have attributes in common with their existing customers. In the past, identifying such lookalike audience members has been too time-consuming and too memory intensive for practical, real-time application. Rather than use conventional techniques that make take hours or days to identify lookalike members, the disclosure may operate in near real-time to identify one or more individuals to which a targeting audience may be expanded. In the present context, near real-time operation corresponds to the amount of time required by an online advertising system to, for example, put into place a new advertising segment or a modified advertising segment specified by an advertiser. The lookalike audience expansion is done in conjunction with the search query response or the click through so that the expanded audience members are included in the total audience during the current process to identify advertisements or other data to show to the total audience. Other benefits are provided as well.

In some aspects, the Internet has developed as a way to put end users in touch with promoters of goods and services. These products are the subject of advertisements which are suitably displayed to the end users. An ad serving system includes one or more server computer which selects ads to be displayed to the user and communicates data defining the ad over a network including the internet to the end user. Such advertising may include display advertising, sponsored search advertising, content marketing and mobile advertising, as well as others now in use or later developed. Further, the ad serving system collects information about the end user's response to the advertisement. Responses may include viewing the ad, clicking on the ad to follow a link to a network address set by the advertiser, making a purchase or providing information by the end user. Advertising allows publishers of content on the Internet to monetize the content.

Various monetization techniques or models may be used in connection with online advertising, including sponsored search advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

A process of buying or selling online advertisements may involve a number of different entities, including advertisers, publishers, agencies, networks, or developers. To simplify this process, organization systems called ad exchanges may associate advertisers or publishers, such as via a platform to facilitate buying or selling of online advertisement inventory from multiple ad networks. The term ad networks refers to aggregation of ad space supply from publishers, such as for provision en masse to advertisers.

For web portals like Yahoo, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users One approach to presenting targeted advertisements includes employing demographic characteristics. Such demographic characteristics may include age, income, sex, occupation, etc., for example. These may be used for predicting user behavior, such as by group. Advertisements may be presented to users in a targeted audience based at least in part upon predicted user behaviors.

Another approach includes profile-type ad targeting or behavioral targeting. In this approach, user profiles specific to a user may be generated to model user behavior. In one example, a user's path through a web site or network of sites may be tracked, and a profile may be compiled based at least in part on pages or advertisements ultimately delivered to the user. A correlation may be identified, such as for user purchases, for example. An identified correlation may be used to target potential purchasers by targeting content or advertisements to particular users. The targeted potential purchasers form a targetable audience.

Advertisement targeting improves the chances of making a connection between a user and an advertiser or other promoter. Increasing the relevance of an advertisement increases the likelihood that a user will respond to the advertisement. Similarly, increasing the audience of users to which a targeted ad is shown may increase the likelihood of the ad appealing to more users.

One way to increase the audience for an advertisement is the use of lookalike audiences. A lookalike audience is one which has one or more attributes in common with an existing targetable audience. Lookalike audience expansion is a process of identifying users who may be added to the targetable audience because of the one or more common attributes.

Finding common attributes requires processing data about the advertising segment to be targeted and the population of users to which the segment audience may be expanded. Identification of users with common attributes becomes possible because web portals and other online providers obtain and store a variety of data about users and user behavior. This data can relate to web sites visited by the user or the user's device, purchases made, telephone calls made by a mobile device, etc. Especially when tracked over time, this user attribute data can provide a meaningful understanding of the user's interests and affinities. This data may be processed to determine if the user qualifies as a lookalike audience for an existing advertising segment. An advertising segment is a homogeneous group of users sharing one or more behavioral characteristics. A segment or a combination of segments defines a targetable group of users.

A lookalike audience can be used to support many business objectives such as targeting users who have associated with them similar attributes. The similar attributes may be a list of purchases, site registration pixels, mobile devices with specific installed applications or apps, usage patterns, ad clicks, support expressed for a politician, interest expressed in a sports teams, demonstrated common interests and so on. The input of a lookalike audience process may be information identifying users such as a list of user identifiers. Examples include mobile device identifiers, email identifiers, account identifiers or phone numbers. Members of this list are called seed users. The output of the lookalike audience process is an extended list of users who look like the seed users in some aspects so that the ad serving system can target a much larger audience.

Use of a lookalike audience by an advertiser provides many convenient benefits. With a lookalike audience, advertisers can simply upload a list of seed users to the ad serving system to generate a customized audience without having to know any detail about user features used in the ad serving system. This simplifies the process and greatly improves user-friendliness for the advertiser.

This disclosure presents methods and systems for near real-time (NRT) lookalike audience expansion in advertisement targeting. The disclosed methods and systems allow advertisers to reach new people who are likely to be interested in the business because they are similar to the existing customers in a near real-time fashion. Compared to other targeting technologies, near real-time lookalike audience expansion dramatically simplifies the way to reach highly relevant people, significantly improving ads targeting performance and boosting revenue.

One known product from an online service provider allows advertisers to reach people who have already visited the sites to connect with an audience that is already interested in the products and services. This product has a feature that may be referred to as "similar audience" which enables the advertisers to find people who share characteristics with the site visitors to reach new and qualified potential customers. Another product from another service provider may be referred to as "lookalike audience" and is presented as a way to reach new users who are likely to be interested in the business because they are similar to the existing customers. Recently, a third service provider also added a lookalike audience feature to gain insights about potentially valuable customers, who are then targeted for advertising outreach.

Nonetheless, none of these products can operate a lookalike audience feature in a near real-time fashion. This is due to the huge computational and space complexity of the problem of identifying potential audience members who look like current members of the targetable audience. Accordingly, these known products have only proved the effectiveness of lookalike modeling as an advertising targeting technique. These known solutions are limited by the amount of processing power required to perform a conventional lookalike audience function, along with the computational processing power required and the memory space required by the conventional solution. In actuality, conventional processing takes hours or up to dozens of hours for the lookalike audience to apply after its creation, especially when the user set and the feature set are very large. One of the products mentioned above even cautions on its "lookalike audience" web page, "Note: it may take 6 to 24 hours for your Lookalike Audience to be created. After that, it will refresh every 3 to 7 days as long as you're still actively targeting ads to that audience." The volume of data to be processed has required a conventional solution that requires days of processing time, even independent of the amount of processing power and memory storage applied to the task.

However, advertisement targeting is a time-sensitive operation. In particular, users are sensitive to the time lapse between clicking on a link in an on-screen advertisement or submitted a search request and the time when a new screen of information is displayed. Too much delay leads to degrading targeting performance. One extreme example is an advertising campaign for sales on a Black Friday evening, the day after the Thanksgiving holiday in the United States, when substantial online shopping takes place. At such a busy time, expanding the lookalike audience to include more people who are interested in buying a laptop, but with a few hours of processing delay to develop the lookalike audience, would drastically decrease the meaningfulness and performance of the campaign. Another issue is scalability and the question of how many seeds may be used to build a reasonable lookalike audience, along with the related question of how many seeds are too few for good performance. Further, memory footprint is also an issue. Calculating similarities for lookalike audiences among billions of users in a user base may require tens of Gigabytes of memory, if not more. These obstacles limit the usefulness of lookalike audience expansion for ad targeting.

To illustrate, consider an example in which there are 1000 lookalike audience members in the system, each with around 5 million seed users, along with 1 billion-user base and 1 million-feature base. In a conventional system, the total time spent on feature extraction and lookalike modeling can easily add up to a few hours for a conventional lookalike audience advertisement targeting system.

Considering the issues of real time operation and scalability, conventional systems must trade off real time operation or scalability. Users either have to wait a very long time, perhaps hours or even tens of hours, to see a newly created lookalike campaign start to take effect. Even if solutions are found, the conventional system cannot instantaneously qualify a user's stream events for audience expansion. On the contrary, the conventional lookalike audience modeling system normally works with batch jobs supported by Apache Hadoop, an open source software framework, for example. To shorten modeling time, some products actually limit the number of seed users, which leads to lower computational and space complexity. Unfortunately, limiting the number of seed users also leads to accuracy and performance issues.

Embodiments in accordance with the present disclosure effectively solve these issues and present innovative methods and systems that can perform near real-time lookalike audience expansion in advertising targeting systems. A system and method in accordance with the present disclosure can evaluate received near real-time data streams such as impressions, clicks and conversions as well as received search events. These data streams and search events can be evaluated for audience expansion and the results can be applied substantially instantaneously. Also, any newly generated lookalike audience can be applied with less than one minute of delay.

In this manner, the performance of a computer data processing system of one or more computers and data storage elements may be improved relative to the conventional solutions. The technical problem of too much processing time and memory space being required to produce results in approximate real time is solved by the techniques and devices described below.

Referring now to the drawing, FIG. 1 is a block diagram of an exemplary online information system 100. The online information system 100 in the exemplary embodiment of FIG. 1 includes an account server 102, an account database 104, a search engine 106, an advertisement (ad) server 108, an ad database 110, an audience expansion engine 112 and a user database 114. The online information system 100 may be accessible over a network 120 by one or more advertiser devices such as advertiser device 122 and by one or more user devices such as user device 124. In various examples of such an online information system 100, users may search for and obtain content from sources over the network 120.

Advertisers may provide advertisements for placement on web pages and other communications sent over the network to user devices such as the user device 124. The online information system 100 in one example is deployed and operated by an online provider such as Yahoo! Inc.

The account server 102 stores account information for advertisers. The account server 102 is in data communication with the account database 104. Account information may include one or more database records associated with each respective advertiser. Any suitable information may be stored, maintained, updated and read from the account database 104 by the account server 102. Examples include advertiser identification information, advertiser security information such as passwords and other security credentials, and account balance information. In some embodiments, an online provider which manages the online information system 100 may assign one or more account managers to a respective advertiser, and information about the one or more account managers may be maintained in the account database 104 as well as information obtained and recorded for subsequent access by an account manager.

The account server 102 may be implemented using any suitable device. The account management server 102 may be implemented as a single server, a plurality of servers, or any other type of computing device known in the art. Preferably, access to the account server 102 is accomplished through a firewall, not shown, which protects the account management programs and the account information from external tampering. Additional security may be provided via enhancements to the standard communications protocols such as Secure HTTP or the Secure Sockets Layer.

The account server 102 may provide an advertiser front end to simplify the process of accessing the account information of an advertiser. The advertiser front end may be a program, application or software routine that forms a user interface. In one particular embodiment, the advertiser front end is accessible as a web site with one or more web pages that an accessing advertiser may view on an advertiser device such as advertiser device 122. The advertiser may view and edit account data using the advertiser front end. After editing the advertising data, the account data may then be saved to the account database 104.

The search engine 106 may be implemented as a computer system, one or more servers, or any other computing device known in the art. Alternatively, the search engine 106 may be a computer program, instructions, or software code stored on a computer-readable storage medium that runs on a processor of a single server, a plurality of servers, or any other type of computing device known in the art. The search engine 106 may be accessed, for example, by user devices such as the user device 124 operated by a user over the network 120. The user device 124 communicates a user query to the search engine 106. The search engine 106 locates matching information using any suitable protocol or algorithm and returns information to the user device 124. The search engine 106 may be designed to help users find information located on the Internet or an intranet. In a particular example, the search engine 106 may also provide to the user device 124 over the network 120 a web page with content including search results, information matching the context of a user inquiry, links to other network destinations or information and files of information of interest to a user operating the user device 124.

The search engine 106 may enable a device, such as the user device 124 or any other client device, to search for files of interest using a search query. Typically, the search engine 106 may be accessed by a client device via one or more servers or directly over the network 120. The search engine 106 may, for example, in one illustrative embodiment, comprise a crawler component, an indexer component, an index storage component, a search component, a ranking component, a cache, a profile storage component, a logon component, a profile builder, and one or more application program interfaces (APIs). The search engine 106 may be deployed in a distributed manner, such as via a set of distributed servers, for example. Components may be duplicated within a network, such as for redundancy or better access.

The ad server 108 operates to serve advertisements to user devices such as the user device 124. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser.

For online information providers, advertisements may be displayed on web pages resulting from a user-defined search based at least in part upon one or more search terms. Advertising may be beneficial to users, advertisers, publishers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior.

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

Yet another approach includes targeting based on content of a web page requested by a user. Advertisements may be placed on a web page or in association with other content that is related to the subject of the advertisements. The relationship between the content and the advertisements may be determined in any suitable manner. The overall theme of a particular web page may be ascertained, for example, by analyzing the content presented therein. Moreover, techniques have been developed for displaying advertisements geared to the particular section of the article currently being viewed by the user. Accordingly, an advertisement may be selected by matching keywords/and or phrases within the advertisement and the web page.

One exemplary system and method are disclosed in U.S. patent application Ser. No. 13/836,052, filed Mar. 15, 2013, pending, entitled Efficient Matching of User Profiles with Audience Segments for Audience Buy. This application is incorporated herein in its entirety by this reference.

The ad server 108 includes logic and data operative to format the advertisement data for communication to the user device. The ad server 108 is in data communication with the ad database 110. The ad database 110 stores information including data defining advertisements to be served to user devices. This advertisement data may be stored in the ad database 110 by another data processing device or by an advertiser.

Further, the ad server 108 is in data communication with the network 120. The ad server 108 communicates ad data and other information to devices over the network 120. This information may include advertisement data communicated to a user device. This information may also include advertisement data and other information communicated with an advertiser device such as the advertiser device 122. An advertiser operating an advertiser device may access the ad server 108 over the network to access information including advertisement data. This access may include developing advertisement creatives, editing advertisement data, deleting advertisement data and other activities.

The ad server 108 may provide an advertiser front end to simplify the process of accessing the advertising data of an advertiser. The advertiser front end may be a program, application or software routine that forms a user interface. In one particular embodiment, the advertiser front end is accessible as a web site with one or more web pages that an accessing advertiser may view on the advertiser device. The advertiser may view and edit advertising data using the advertiser front end. After editing the advertising data, the advertising data may then be saved to the ad database 110 for subsequent communication in advertisements to a user device. In some examples, the advertiser front end is operative to receive information defining seed users for use in a lookalike audience expansion operation as will be described in greater detail below.

The advertisement server 108 may be a computer system, one or more servers, or any other computing device known in the art. Alternatively, the advertisement server 108 may be a computer program, instructions and/or software code stored on a computer-readable storage medium that runs on a processor of a single server, a plurality of servers, or any other type of computing device known in the art.

The audience expansion engine 112 is in data communication over one or more networks with other components including the user database 114 and the ad server 108. The audience expansion engine 112 operates to develop a lookalike audience based on input information received from an advertiser. The input information may be in the form of user identification information which identifies one or more seed users. The user identification information may be user data in the form of user identifiers such as mobile device identifiers for mobile devices associated with the users, electronic mail (email) identifiers for the users, account identifiers associated with the users, and so on. For example, the mobile device identifiers may include mobile phone numbers or electronic serial numbers or any other data used to uniquely identify a user.

The output of the audience expansion engine 112 in some embodiments is lookalike audience information identifying users who look like the seed users. The lookalike audience information may be, for example, a list of user identifier data which uniquely identifies the members of the lookalike audience. The advertisement server 108 may receive the lookalike audience information from the audience expansion engine 112 and combine the lookalike audience information with other targetable audience information to expand the audience to which advertisements are targeted. The audience expansion engine 112 is configured to identify users of the online information system 100 who have a degree of similarity to members of the lookalike audience. The audience expansion engine 112 performs a comparison operation between properties of the members of the lookalike audience and the users of the online information system 100. Information about the users of the online information system 100 may be stored in the user database 114.

Operation of the audience expansion engine 112 will be described in greater detail below. However, the audience expansion engine 112 provides a substantial technical benefit in that, by use of the audience expansion engine 112, advertisers can simply provide to the ad server 108 a list of seed users to generate a customized audience without having to know any detail about user features used in the online information system 100. This improves user-friendliness for the advertiser and simplifies operation. Moreover, as will be discussed below, the audience expansion engine 112 reduces computing resources and data storage resources required to develop the lookalike audience and to do so substantially in real time, relative to convention devices and algorithms. Thus, implementation of the audience expansion engine 112 operates to improve the performance of a computer on which it is implemented relative to the conventional systems and methods.

As noted, further benefits of the audience expansion engine 112 include near-real time lookalike expansion operation for ad targeting. This allows advertisers to reach new people who are likely to be interested in the business because they are similar to the existing customers in an existing targetable audience, in a near real-time fashion. Comparing to other targeting technologies, near real-time lookalike audience expansion dramatically simplifies the way to reach highly relevant users, significantly improving ads targeting performance and boosting revenue.

The user database 114 is in data communication with components including the audience expansion engine 112 and stores data and instructions for use by the audience expansion engine 112. In particular, the user database 114 stores information about users of the online information system. Any appropriate type and amount of information may be stored, in any suitable format. In some embodiments, the user database 114 stores information about online activities of the users of the online information system. Such stored information may include keywords searched, search results returned, ad impressions received, ad clickthroughs detected, purchases made by the user, information entered by the user such as identification and demographic information, web sites visited, etc. This information may be detected and stored in the database by any suitable device in the system such as the ad server 108, the search engine 106 and the account server 102. In general, this may be a very large amount of data for each respective user, and there may be many thousands or millions of users. Thus, in some embodiments, the user database 114 is a distributed database whose storage and functionality are distributed over many physical machines.

The account server 102, the search engine 106, the ad server 108 and the audience expansion engine 112 may be implemented as any suitable computing device or combination of computing devices. The functions described for these components of the system 100 may be shared and apportioned among a variety of hardware components as design and performance requirements dictate. The allocation of a particular function to a particular computing device in FIG. 1 is by way of example only and is not intended to be limiting to any embodiment. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The account server 102, the search engine 106, the ad server 108 and the audience expansion engine 112 may be implemented as content servers or may be in communication with content servers. A content server may include a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc. The content servers may not be under common ownership or control with the ad server or servers.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks such as may employ differing architectures or may be compliant or compatible with differing protocols, may interoperate within a larger network such as the network 120. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The advertiser device 122 includes any data processing device which may access the online information system 100 over the network 120. The advertiser device 122 is operative to interact over the network 120 with the account server 102, the search engine 106, the ad server 108, content servers and other data processing systems. The advertiser device 122 may, for example, implement a web browser for viewing web pages and submitting user requests. The advertiser device 122 may communicate data to the online information system 100, including data defining web pages and other information such as a list of seed users for use by the audience expansion engine 112. The advertiser device 122 may receive communications from the online information system 100, including data defining web pages and advertising creatives.

The user device 124 includes any data processing device which may access the online information system 100 over the network 120. The user device 124 is operative to interact over the network 120 with the search engine 106. The user device 124 may, for example, implement a web browser for viewing web pages and submitting user requests. A user operating the user device 124 may enter a search request and communicate the search request to the online information system 100. The search request is processed by the search engine and search results are returned to the user device 124. In other examples, a user of the user device 124 may request data such as a page of information from the online information processing system 100. The data instead may be provided in another environment such as a native mobile application, TV application, or an audio application. The online information processing system 100 may provide the data or re-direct the browser to another web site. In addition, the ad server 108 may select advertisements from the ad database 110 and include data defining the advertisements in the provided data to the user device 124.

The advertiser device 122 and the user device 124 operate as a client device when accessing information on the online information system. A client device such as the advertiser device 122 and the user device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, a laptop computer 126 and a smartphone 128 may be operated interchangeably as an advertiser device or as a user device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. A client device such as the advertiser device 122 and the user device 124 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. The foregoing is provided to illustrate that claimed subject matter is intended to include a wide range of possible features or capabilities.

Figure 2:
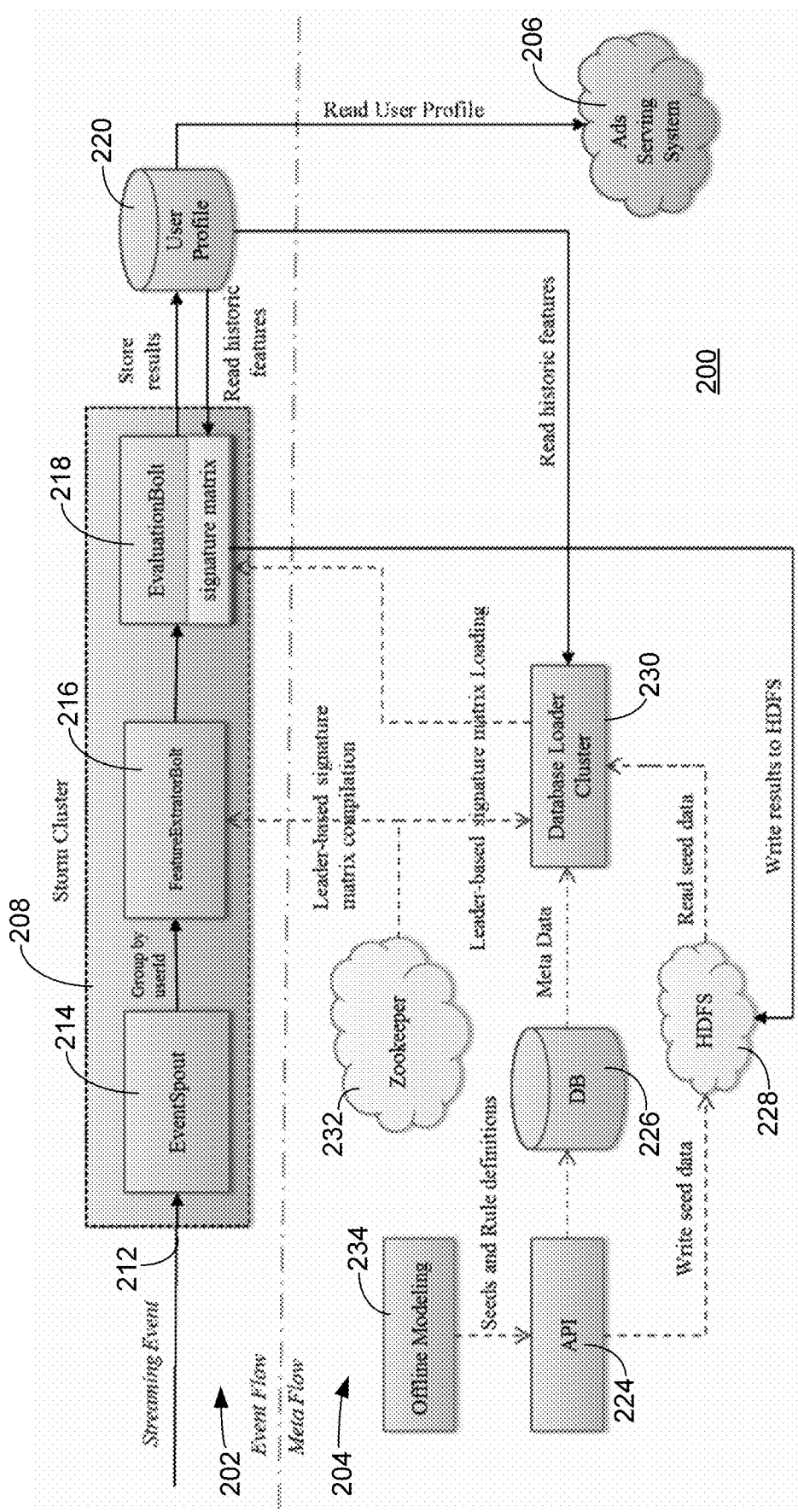
FIG. 2 is an example of a functional block diagram illustrating operation of an audience expansion engine.

FIG. 2 is a functional block diagram illustrating operation of an audience expansion engine 200 for use in conjunction with a system such as the online information system 100 of FIG. 1. The audience expansion engine 200 may be implemented by any suitable data processing system such as a server computer or other computer system including a data processing circuit and memory storage such as a database.

The functional block diagram of FIG. 2 includes an event flow 202 and a metadata flow 204, shown in association with an advertisement serving system 206. The event flow 202 includes an event flow data processing system 208 and a user profile database 220. The event flow data processing system 208 receives at an input 212 an input stream of user events originating with end users. End users are individuals and data processing devices such as laptop computers and mobile devices which are interacting with networked systems such as the advertisement serving system 206. The user events may include the widest variety of actions and occurrences in connection with a user's online activity. This can include information about search requests submitted by a user, information about impressions received by a user, information about click-through events from the user, information about completed transactions by a user. Other stream events may be received as well. In some embodiments, the received stream event includes a data file with information about the stream event, such as uniform resource locators (URLs) of web pages visited, time stamp information marking an occurrence of the stream event, a user identified associated with the user, and any other information that is available. In some examples, the event flow data processing system 208 may consume more than 100,000 events per second. The received streaming events are processed by the event flow data processing system 208. Resulting data from the event flow data processing system 208 is stored in the user profile database 210.

In the exemplary embodiment of FIG. 2, the event flow data processing system 208 is implemented as an Apache Storm Cluster. Apache Storm is an open source, distributed real-time computation system. Apache Storm is scalable in that additional processors, servers or nodes can be grouped to form one or more clusters which can communicate over one or more data networks. The servers of the clusters may cooperate to break down a task into multiple processes and execute the process. In this manner, an Apache Storm cluster such as the event flow data processing system 206 may expand processing capability, so that even very large amounts of data, received in a short amount of time, can be reliably processed. Apache Storm is particularly well adapted to reliably processing unbounded streams of data, such as the streaming events received at the input 212. Other similar types of data processing system may be substituted, as will be recognized by those of ordinary skill in the art.

In the embodiment of FIG. 2, the event flow data processing system 208 includes an event spout 214, a feature extractor bolt 216 and an evaluation bolt 218. These terms reflect the Apache Storm data processing environment used in this example. Other hardware, firmware and software may be substituted to maintain similar function. Within an Apache Storm system, data is processed as a stream. A stream is an unbounded sequence of tuples. Apache Storm enables transforming a received stream into a new stream in a distributed and reliable way. A spout may be executable code or logic or other hardware or software that forms a source of streams. For example, a spout may read tuples from a source and emit them as a stream.

In the example of FIG. 2, event spout 214 reads incoming event data at the input 212 and emits the events as a stream of data in a predetermined format. In Apache Storm, a bolt may be executable code or logic or other hardware or software that consumes any number of input streams, does some processing, and possibly emits new streams. Complex stream transformations by a bolt may require multiple steps and thus multiple bolts. Bolts can perform many operations, from running functions, filtering tuples, doing streaming aggregations, doing streaming joins and storing to and reading from databases such as the user profile database 210. Operation of the feature extraction bolt 216 and the evaluation bolt 218 will be described in more detail below.

The feature extractor bolt 216 includes code, logic or other hardware such as a processor or server, or other software that operates to extract information from the events received at the input 212. For example, when a keyword search event is received, the event may be a data file including information such as the keyword searched for, the unique user identifier of the end user who submitted the keyword search, location information for the user or the user device with which the keyword search event initiated, search results provided in response to the keyword search event, and any other available information. If the user is accessing an online shopping site and has items in a virtual shopping cart, information about the items in the shopping cart will be processed by the feature extractor bolt 216. This information in this example might include descriptions of the items, quantity of the items, cost of the items and any other available information that can be parsed from the received event. The respective data items are extracted and subsequently considered features. The feature extractor bolt 216 parses the data contained in the events received at the input 212.

The evaluation bolt 218 receives information and data about received events from the feature extraction bolt 216. The evaluation bolt 218 includes code, logic or other hardware such as a processor or server, or other software that operates to evaluate the contents of each event, organize the contents appropriately and store results of the evaluation. For example, if a received event involves an action taken by a particular user, the user and the action taken are identified from the data of the event. If appropriate, the information from the processed event may be stored by the evaluation bolt in a storage destination such as the user profile database 220. Also, if appropriate, the evaluation bolt may read stored data from the user profile database 220. The evaluation bolt 218 stores a signature matrix 222 for use in evaluating a lookalike audience, as will be discussed in greater detail below.

The user profile database 220 stores information about respective users. For example, if a user has registered with the online information system 100, such as by providing a name, a mobile telephone number, an email address or other identifying data, a user profile containing collected data about the user may be maintained in the user profile database 220. As the user, or a device associated with the user such as a mobile telephone, interacts with the online information system 100, information about new events will be received at the input 212 and processed by the event spout 214. As the new events are processed by the feature extractor bolt 216, the user profile stored in the user profile database 220 may be updated to reflect new data and information obtained from the new events. The user profile database 220 may be operable to provide user profile information to the evaluation bolt 218 for use in evaluating received events, for example. The user profile database 220 may also be operable to provide user profile information to the advertisement serving system 206, for example, for use when targeting advertisements to users that meet a particular profile. Based on the user profile, the advertisement serving system 206 can determine what segments a particular user qualifies for and select an advertisement accordingly.

The metadata flow 204 includes an application program interface (API) 224, a database 226, a Hadoop distributed file system (HDFS) 228, a database loader cluster 230, and a zookeeper 232. It will be recognized that, in alternative embodiments, the functions and operations performed by the devices of the metadata flow 204 may be distributed differently among other combinations of hardware, firmware and software.

The API 224 operates as a front end to communicate with a user's offline modelling device 234. The offline modelling device 234 may be any computing device such as a laptop computer, tablet, mobile phone or other device. The offline modelling device 234 is used by the user to develop a seed list for the lookalike audience. The seed list may be in the format of a comma separated value (CSV) file containing text defining the elements of the seed list. The seed list may be a new seed list containing information about a desired lookalike audience or an updated seed list containing additions or deletions of audience members relative to an earlier seed list. The seed list may include any suitable information, such as user identifiers, mobile telephone numbers, user email addresses and other information. Further, any rule definitions established by the user using the offline modelling device 234 are provided to the API 224 as well.

The API 224 operates as a user interface for the offline modelling device 234. The API 224 is configured to receive the seed list from the offline modelling device. The API 224 may be any code or software or other facility running on any suitable computing device to communicate over a network such as the internet with the offline modelling device. Using the API 224, a user at the offline modeling device 234 is able to upload a seed list for the lookalike audience to the metadata flow 204. The API 224 stores the seed list in the HDFS 228. The API 224 stores metadata received from the user in the database 226. Thus, the complete seed list for the lookalike audience, as well as any incremental changes for a given audience, is stored The database 226 operates to store data of the metadata flow 204 including seed list information and lookalike audience information. The database 226 may be formed in any suitable manner, using suitable data storage equipment.

The database 226 is accessible for storage and retrieval of data by other devices such as the API 224, the HDFS 228 and the database loader cluster 230.

The HDFS 228 operates to store data such as the seed list received from the API 224. The Hadoop distributed file system (HDFS) is a distributed, scalable, and portable file-system written in Java for the Hadoop framework. Hadoop or Apache Hadoop is an open source framework for distributed data storage and processing. HDFS stores large files, typically in the range of gigabytes to terabytes in size, across multiple machines. The HDFS 228 may be any suitable data storage element such as a disk storage system or collection of such systems. As indicated, storage provided by the HDFS 228 may be distributed over a variety of storage devices, which may be located remotely, which are accessible over one or more networks.

The database loader cluster 230 receives meta data from the database 226 and receives seed data from the HDSF 228. The database loader cluster 230 operates to detect any changes in the lookalike audiences stored in the database 226. When changes are detected, the database loader cluster 230 detects the changes and loads them into the database for subsequent processing. The database loader cluster 230 further operates to extract features from the users that make up the seed list. Further, the database loader cluster 230 is in data communication with the user profile database 220 to receive user profile information and seeks to find, for example, the most common features among the users that make up the seed list. Common features may include previously-searched keywords, address and demographic information, and so forth. The database loader cluster 230 identifies common features and builds the signature matrix 222. The signature matrix 222 is stored to the evaluation bolt 218. The evaluation bolt 218 can use the signature matrix 222 to evaluate incoming streaming events.

The zookeeper 232 is an Apache function. The zookeeper 232 allows distributed processes such as the database loader cluster 236 and the feature extraction bolt 216 to coordinate operations with each other.

In operation, advertisers create or update a lookalike audience through the API 224 by uploading a list of seeds, such as in a .csv file. The complete seed list for the lookalike audience, as well as any incremental changes of a given lookalike audience, is stored in the HDFS 228 by the API 224. This process triggers the database loader cluster 230 to begin processing algorithms to compile the signature matrix 222. The signature matrix 222 may be stored in the database 226 or any other convenient location. Devices that require the signature matrix 222, such as the evaluation bolt 218, retrieve the signature matrix 222 from storage. The storm cluster 208 operates to constantly consume user event streams received at the input 212 and evaluates if a pre-configured lookalike audience can be expanded to include the current user, using the in-memory signature matrix 222. If so, the storm cluster 208 writes the results to the user profile database 220 and the HDFS 228.

Subsequently, the ad serving system 206 receives a request for advertisements to provide to a web page requested by a user. The ad serving system 206 looks up the user profile for the requesting user in the user profile database 220. The ad serving system 206 receives all qualified audiences, including lookalike audiences, for the current ad request. The ad serving system 206 decides the best advertisements to serve to the user. In some embodiments, a feedback loop may be put into place by periodically calculating performance of the lookalike audiences based on historic results. For example, the system may identify features of users in a lookalike audience that make them more likely to click on an advertisement. This process may involve collection of data from ad serving logs. This information is used to modify and update models being used to define the lookalike audience. This process of calculating performance information may be done offline if it is computationally intensive so as to maintain near-real time performance for the audience expansion engine 200. The performance information is fed back to the database 226. Offline models such as the offline modelling device 234, use the historic performance information to train models for better performance in the future.

Figure 3:
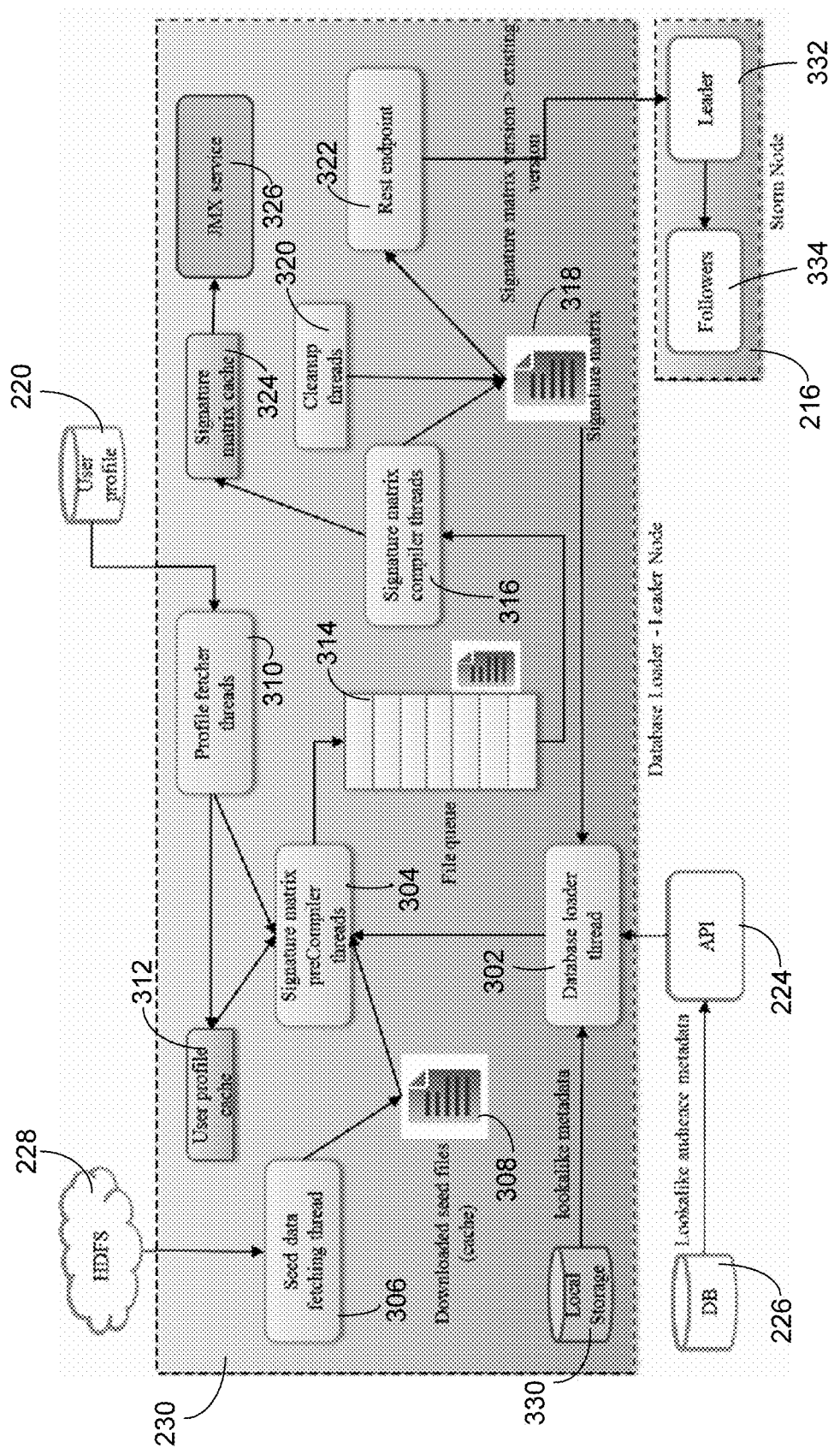
FIG. 3 is a functional block diagram of an exemplary signature matrix compilation process for near real-time audience expansion in advertisement targeting.

FIG. 3 is a functional block diagram of an exemplary signature matrix compilation process 300 for near real-time audience expansion in advertisement targeting. The signature matrix compilation process 300 may be implemented in any suitable hardware device or combination of hardware, firmware and software. Suitable hardware includes any processor, server or other computing device operable with data and instructions to perform the functions described herein and related functions.

The signature matrix compilation process 300 includes the database loader cluster 230 which is in data communication with the user profile database 220, the HDFS 228, the database 226, the API 224 and one or more storm nodes such as storm cluster 216. The signature matrix compilation process 300 uses an Apache leader-based signature matrix compilation workflow at the database loader cluster 230, as shown in FIG. 3. The database loader cluster 230 in this example is a cluster of several independent computing devices which cooperate together to perform the functions described here. Here, the matrix compilation process leverages tools including Apache Zookeeper and Apache Curator to manage the cluster. Apache Zookeeper is a client/server system for distributed coordination that can, for example, choose leaders dynamically. A leader is the single device that manages a process. The client uses a client library to connect to the server. The client library exposes APIs that may appear as a simple file system. Apache Curator provides benefits such as connection management. Other tools besides or in addition to these Apache tools may be used to manage the cluster. Also, Apache provides a leader server and follower server. In the exemplary embodiments, the leader node can take the leadership to coordinate the follower nodes to jointly compile the signature matrix. With this distributed signature matrix compilation algorithm, where multiple nodes contributed resources to the compiling load, the total compiling time is significantly reduced.

When a lookalike audience is created, it consists primarily of user identification information and rules that are applied to the users. The database 226 stores metadata, such as the user identification information for seed users. The HDFS 228 stores the actual user profile information about the seed users. User profile information may include a wide variety and large quantity of information about user demographics and activity. Metadata is used in place of all user profile data because of the size or amount of user profile data involved. A signature audience may have a million users, as an example. All user profile data for those users is stored on the HDFS 228 with only metadata, such as user identification information, stored in the database 226. When a signature matrix is to be created, initial steps include retrieving all user data from the HDFS 228.

The user data is pre-compiled in this example. For each user, the user's user profile needs to be reviewed to learn as much as possible about the seed users. User activities, such as clickthroughs and purchases and page views, are reviewed to determine common features about the users. The results of the pre-compilation are fed to a file queue for consumption by a signature matrix compiler process. The signature matrix compiler process builds a hash table which records the similarity among all the users based on all their features but with dramatically decreased complexity. The signature matrix is passed to a storm node or storm cluster 216 and can be used in production for near-real time evaluation of streaming events.

In the exemplary embodiment of FIG. 3, the database loader cluster 230 includes a database loader thread 302, a signature matrix pre-compiler thread 304, a seed data fetching thread 306, downloaded seed files 308, a profile fetcher thread 310 and a user profile cache 312. The database loader cluster 230 further includes a file queue 314, a signature matrix compiler thread 316, a signature matrix store 318, cleanup threads 320, a Representational State Transfer (REST) endpoint 322, a signature matrix cache 324 and a Java Management Extensions (JMX) service 326. Other embodiments may include additional or alternative components configured to perform similar or substantially the same functionality as described herein. Further, the database loader cluster 230 may be formed from any suitable combination of hardware, firmware and software as well as any combination of processors, servers and other computing devices.

The database loader thread 302 operates to load lookalike audience information from the database 226 through the API 224. Further, the database loader thread 302 operates to load lookalike metadata from the local storage 330. In the exemplary embodiment of FIG. 3, several respective threads are illustrated for implementing respective portions of the functionality of the database loader cluster 230. A thread is the smallest sequence of programmed instructions that can be managed independently by a scheduler of a server or other device. The respective threads may include one or more threads running concurrently and may share resources such as memory and context including variable values.

The signature matrix pre-compiler thread 304 collects data from different sources in advance of compiling a signature matrix. For example, the seed data fetching thread 306 receives seed data from the HDFS 228 and stores the downloaded seed files 308 in a cache memory or other data store. The signature matrix pre-compiler thread 304 receives the stored seed files 308 from the cache. Further, the profile fetcher threads 310 retrieve user profile information from the user profile database 220 and store the user profile information in the user profile cache 312. The signature matrix pre-compiler thread 304 combines the lookalike metadata, the lookalike audience metadata, the seed files, and the user profile information, processes the information and stores the result in the file queue 314. The file queue may be, for example, an Apache Kafka file-based queue.

The signature matrix compiler thread 316 operates to compile one or more signature matrixes using information in the file queue 314. The operation of compiling the signature matrix is described in more detail below. Each signature matrix for each lookalike audience may be several gigabytes of data in size, depending on the number of seed users and the number of features of each user. The resulting signature matrix is written by the signature matrix compiler thread 316 to a signature matrix cache 324 and the signature matrix store 318, which may be a hard drive or other data store. The signature matrix is provided from the signature matrix store 318 to the REST endpoint 322. The REST endpoint 322 permits Create, Retrieve, Update, and Delete actions to be permitted on records such as the signature matrix. The new or updated signature matrix is provided from the REST endpoint to the storm node 216. In the example, the storm node 216 has a leader server 332 and one or more followers 334. The JMX services 326 implement Java Management Extension Services which permit management and monitoring of applications, objects and devices.

In operation, in the example as shown in FIG. 3, the database loader thread 302 constantly pulls the lookalike audience metadata changes from the database 226 by means of the API 224. Whenever there is a new lookalike audience or a change in an existing lookalike audience, the database loader thread 302 spawns a few pre-compiler threads 304 to prepare the data for signature matrix compilation, including fetching the seed data by means of the seed data fetching thread 306, fetching the features for each user by means of the profile fetcher thread 310 and the user profile cache 312, and by transforming data as necessary. The pre-compiler threads 304 use the file queue 314, which may be a persistent distributed queue such as a Kafka, file-based queue. The distributed file queue 314 is used rather than a simple buffer or other structure because of the large volume of use data being processed. The pre-compiler threads 304 signal the signature matrix compiler threads 316 so that the signature matrix compiler threads 316 can start to build the signature matrix or matrices. After the signature matrix compiler threads 316 finish, the signature matrices will be versioned and serialized to the signature matrix store 318. The REST endpoint 322 is provided so that storm leaders such as leader 332 of the storm node 216 can constantly pull the newest signature matrixes and load them to their own memory. Further, the cleanup thread 320 periodically collects outdated signature matrices from the hard drive of the signature matrix store 318 to free space. Because the signature matrices can be large in size, outdated or unused signature matrices can consume a large amount of disk space on a hard drive such as the signature matrix store 318. This process of eliminating outdated signature matrices serves on a timely basis using cleanup threads 320 of the database cluster loader 230 operates to reduce the amount of data storage required by the signature matrix compilation process 300.

Signature Matrix Compilation and Live Event Evaluation Process

Generally, developing a lookalike audience segment means that the audience expansion engine 200 (FIG. 2) needs to find out if any two users have enough similarity in terms of their features, such as installed apps, browsed websites, searched keywords, purchased items and so on. Conventional methods to calculate the similarities include calculating a cosine similarity and a Jaccard similarity. However, using brute-force similarity calculation algorithms, such as cosine similarity and Jaccard similarity, have severe scalability issues. Calculating pairwise similarities among a large number of users is computationally infeasible, with overall computational complexity of $O(KMN^2)$ for N users and M seeds with K features. For example, in a typical online targeting market, the computational cost can easily reach $10^{29}$ for 1 billion users, 100,000 seeds and 1 million features per ad campaign. A system requiring such computational cost can never support a system intended to be near-real time.

However, the scope of the computation can be better managed using Locality Sensitive Hashing (LSH). LSH is a known data processing technique for reducing the dimensionality of high-dimensional data. LSH can transform a seed user feature vector into a similarity-preserving signature, where each value in the signature leads to a cluster of users who are similar to the seed, with a bounded probability. Thus, the present exemplary embodiment uses minHash to approximate Jaccard similarity. MinHash refers to a min-wise independent permutations locality sensitive hashing scheme. MinHash is a technique for quickly estimating how similar two sets are. MinHash is a family of random hashing functions that can preserve Jaccard similarity among binary feature vectors. To further improve accuracy, current embodiments use 160 (4×40) independent MinHash functions to generate a signature for each user, instead of just one MinHash function. In general, a signature generated using k MinHash functions is a k-dimensional vector. A signature for all N users is an N*k matrix, defined as signature matrix.

LSH can cluster similar users into buckets for retrieval or evaluation purposes using the compiled k-dimensional signatures. Further, the k signature dimensions can be partitioned into b bands, where each band consists of r signature dimensions, i.e., b*r=k. Users are then clustered into the same bucket only if they have one or more exactly same band(s). If two users have exactly same features, they should have b exactly same bands. A seed user can only fall into one bucket in a band. Also, users are ranked within the buckets based on the lookalike audience frequency count. In this way, the computational cost and the memory footprint of the signature matrix are dramatically decreased. In one embodiment, the memory footprint of a full signature matrix, including around 1000 lookalike audiences, is less than 2 GB, which small enough for any modern computer to load into its memory for fast evaluation. This improvement avoiding the necessity of much slower Apache Hadoop-based batch jobs. Apache Hadoop is an open-source software framework for distributed storage and distributed processing of very large data sets on computer clusters built from commodity hardware.

The following pseudocode is an example algorithm, referred to as algorithm 1 for convenience, is a generic signature matrix compiling algorithm based on minHash. Algorithm 1 may be used to compile a lookalike audience into a signature matrix. As noted above, the algorithm can be implemented on a typical computer with a processor and memory; no large-scale or distributed computing system is required. For example, the database loader cluster 230, described above in conjunction with FIGS. 2 and 3, is adequate to implement this algorithm in near-real time fashion using a reasonable amount of storage space. Full coding of algorithm 1 is readily within the abilities of those ordinarily skilled in modern programming techniques.

Algorithm 1:

```
signatureMatrix = { }
for seed in lookalikeAudience.getSeedUserList( ):
    features = getFeatures(seed)
    minHashValues = [ ]
    for minHash in minHashFunctionList:
        minHashValues.append(minHash(features))
        # merge the signature into the signature table when needed, i.e.
        every 4
signatures are combined into a bucket in our case, which is called a
BAND
        lshKey = buildSignatureIfNecessary(minHashValues,
        NUMBER_OF_BAND)
        updateSignatureMatrix(signatureMatrix, lshKey,
        seed.getSegmentIds( ),
seed.getOperation( ))
        minHashValues = [ ]
```

Here, signatureMatrix is implemented as a nested hash table with the following definition:
{hashKey, {segmentId, segmentFrequencyCount}}.

Further, seed.getOperation( ) can return either ADD or DELELE, depending on if the user is newly-added to the lookalike audience or just deleted from the audience, probably by an audience update operation. If the function returns ADD, the operation increases the frequency count for the associated segmentId by 1. Otherwise, it is decreased by 1. As can observe from Algorithm 1, the signature matrix construction has a computational complexity of O(kNK). In reality, most of the bottleneck using this approach happens at retrieving features from the User Profile for all the seed users due to network limitations. In the implementation illustrated in FIGS. 2 and 3, these network limitations be greatly mitigated by using connection pools and leader-based signature matrix compilation, where the implementation leverages Apache Zookeeper to coordinate the whole cluster to collaborate the compilation work.

Now that the signature matrix has been compiled successfully by Algorithm 1, the signature matrix can be used for fast retrieval and evaluation of real-time event streams to expand audiences on the fly, in near-real time data flow. The real-time evaluation algorithm for data streams is shown in Algorithm 2.

```
userId = getUserId(currentStreamEvent)
currentFeatures = getCurrentFeatures(currentStreamEvent)
historicFeatures = retrieveHistoricFeaturesFromUserProfile(userId)
features = combineFeatures(currentFeatures, HistoricFeatures)
minHashValues = [ ]
evaluationResult = [ ]
for minHash in minHashFunctionList:
    minHashValues.append(minHash(features))
    lshKey = buildSignatureIfNecessary(minHashValues,
    NUMBER_OF_BAND)
    result1 = fullSignatureMatrix.lookup(lshKey)
    result2 = incrementalSignatureMatrix.lookup(lshKey)
    mergeResult(result1, result2, evaluationResult)
```

Algorithm 2 is a real-time lookalike audience expansion algorithm using a full signature matrix and an incremental signature matrix based on MinHash. Again, Algorithm 2 can be implemented on a conventional data processing system such as is illustrated in FIGS. 2 and 3.

Here it can be observed, the computational complexity is minimal. The computational complexity is generally set by the number of times that the minHash functions are called. In the exemplary implementation, this is 40 for full signature matrix lookup and another 40 for incremental signature matrix lookup. However, merging the results does involve somewhat additional overhead. In an exemplary embodiment, all these computations can be accomplished in less than 1 ms, so the audience expansion does not affect the real-time event consumption in the real-time data pipeline.

Full and Incremental Signature Matrix Compilation and Evaluation for Near-Real Time Audience Update In typical applications, a lookalike audience is formed using a very large number (such as millions) of seed users. Further, each user may have a large user profile, with many online activities recorded such as page views, clickthroughs, etc. Given all these seed users, an audience expansion engine needs to find common features and similarities among the seed users. Similarities are abstracted as features. This represents a lot of computations on a lot of data, and suggests that audience expansion cannot occur in real time. However, the ad serving system needs to create a lookalike segment as quickly as possible so that the new segment can be used immediately for serving ads. Conventional systems require 4-8 hours to create a lookalike segment which is too long for many purposes. Near-real time performance is required.

The disclosed audience expansion engine 200 uses incremental signature matrix compilation along with a full signature matrix to support near real-time lookalike audience update. A full signature matrix is one compiled using multiple lookalike audiences using Algorithm 1, for example. Because of the large number of seed users and large number of users, compilation of a full signature matrix can take 10 to 30 minutes or longer.

Whenever the audience expansion engine 200 detects any lookalike audience metadata change, the system tries to compile the detected change into an incremental signature matrix based on Algorithm 1, discussed above. The change in the lookalike audience metadata may occur because an advertiser creates a new segment. The new segment is a new target group desired by the advertiser. The database loader cluster 230 also constantly performs full signature matrix compilation based on a heuristic algorithm. In one example, whenever there are more than three incremental compilations consecutively for lookalike audiences, the database loader cluster 230 spawns a few signature matrix compiler threads 316 (FIG. 3) to perform the full signature matrix compilation. This is something like a checkpoint in HDFS, which not only improves evaluation performance, but also prevents error propagation. Full signature matrix means the system compiles a single signature matrix for all lookalike audiences, while incremental signature matrix means the system only compiles newly updated lookalike audiences into an incremental signature matrix based on the previous full signature matrix version. Compiling the incremental signature audience takes a relatively short time, such as a few seconds, and is thus considered to be near-real time. The combination of full signature matrix compilation and incremental signature matrix compilation leads to the effective support of near real-time lookalike audience update. However, at evaluation time, this process does need to perform an additional lookup for both signature matrices and then must consolidate the evaluation results. In actuality, this overhead turns out to be minimal.

In general, incremental compilation has to be based on a version of the full signature matrix to ensure the correctness (the latest checkpoint). In actuality, the incremental signature matrix takes a few seconds to finish while full signature matrix can take up to around 1 hour to complete in some embodiments. Thus, during the compilation of the full signature matrix (but before it is available), there is a chance that an incremental signature compilation will happen and is unfortunately based on an older version of full signature matrix. To ensure correctness, when the full signature matrix compilation finishes and needs to swap out the existing older version of the full signature matrix, the incremental signature matrix needs to be converted so that it is based on the newest full signature matrix. Also, the full signature matrix and the converted incremental signature matrix need to be swapped with the existing signature matrices in an atomic way. The details of the algorithms can be better explained with an example, as show in FIG. 4.

Figure 4:
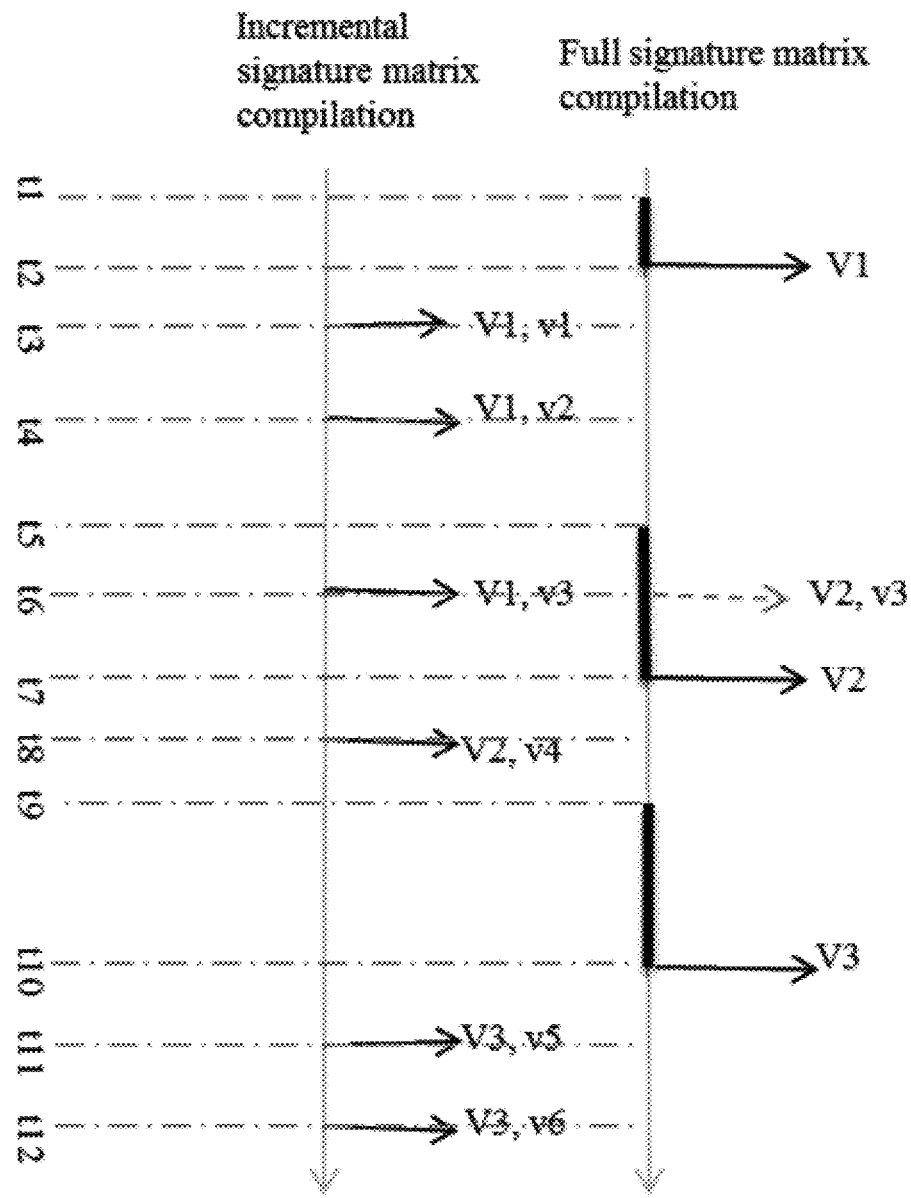
FIG. 4 illustrates an example of full signature matrix compilation and incremental signature matrix compilation.

FIG. 4 illustrates an example of full signature matrix compilation and incremental signature matrix compilation and the real-time evaluation in the ads targeting system for lookalike audience expansion. In this example, uppercase V means the version of fully compiled signature matrix, while lowercase v signifies the version of the incrementally compiled signature matrix. FIG. 4 illustrates how full signature matrix compilation and incremental signature matrix compilation are combined together for near real-time evaluation for lookalike audience expansion in ads targeting. In FIG. 4, time is indicated along the vertical axis, proceeding in incremental time steps from $t_1$ to $t_{12}$ in this example. Operation of the audience expansion engine 200 to compile a full signature matrix or an incremental signature matrix, is shown for the respective time steps of FIG. 4.

The process begins at time step $t_1$. At $t_1$, the audience expansion engine 200 begins to compile a first full signature matrix V1. The process may begin due to any suitable input condition, such as system initiation, the lapse of a timer or designated amount of time, a change in the lookalike audience metadata, determination that three compilations of incremental signature matrices has occurred, or due to any other reason. The full signature matrix may be compiled using any suitable method such as Algorithm 1 described above. The seed list is retrieved from storage and the signature matrix is compiled.

At time step $t_2$, compilation of the first full signature matrix V1 is completed. During time steps $t_2$-$t_3$, the first full signature matrix V1 is used for evaluation of received streaming events. The process of Algorithm 2 may be used for this purpose. The audience expansion engine determines if any pre-configured lookalike audience can be expanded to include the current user, using first full signature matrix V1.

At time step $t_3$, a first incremental signature matrix (V1, v1) is compiled. The first incremental signature matrix is based on the first full signature matrix V1. This process may be initiated by, for example, detection of a change in the lookalike audience metadata stored in relational database or HDFS. During time steps $t_3$ to $t_4$, the first full signature matrix V1 and the incremental signature matrix (V1, v1) are used for evaluating received streaming events.

At time step $t_4$, a second incremental signature matrix (V1, v2) is compiled. The second incremental matrix is based on the first full incremental signature matrix V1. Compiling the second incremental signature matrix (V1, v2) may be initiated by detection of a change in the lookalike audience metadata. During time steps $t_4$ to $t_5$, the first full signature matrix V1 and the second incremental signature matrix (V1, v2) are used for evaluating received streaming events.

At time t5, the audience expansion engine 200 begins to compile a second full signature matrix V2. This process may be initiated by any event such as lapse of a predetermined time period, receipt of new seed users for a lookalike audience, or any other occurrence based on heuristic or deterministic algorithms. In this example, the process of Algorithm 1 may be used to compile the second full signature matrix V2.

During time steps $t_5$ to $t_6$, the first full signature matrix V1 and the second incremental signature matrix (V1, v2) are used for evaluating received streaming events. At time step $t_6$, the second full signature matrix V2 is not fully compiled yet. As noted, in this example, compiling a full signature matrix may take an extended time such as one hour to complete.

At time step $t_6$, a third incremental signature matrix (V1, v3) is compiled. This third incremental signature matrix (V1, v3) is based on the first full signature matrix V1. Compilation of that may be initiated in response to detection of a change in the lookalike audience metadata. During this time step, a first signature matrix compiler thread is compiling the second full signature matrix V2 and a second signature matrix compiler thread is compiling the third incremental signature matrix (V1, v3). The two threads operate in parallel without interference. During time steps $t_6$ to $t_7$, the first full signature matrix V1 and the third incremental signature matrix (V1, v3) are used for evaluating received streaming events.

At time step $t_7$, compilation of the second full signature matrix V2 is complete. The third incremental signature matrix is converted to (V2, v3) so that the third incremental signature matrix is based on the second full signature matrix. This ensures compatibility between the second full signature matrix V2 and the third incremental signature matrix (V2, v3). As noted above, during the compilation of the second full signature matrix V2, but before it is complete and available, it happened that the third incremental signature matrix (V1, v3) was compiled. To ensure correctness, when the second full signature matrix V2 compilation finishes and needs to replace the existing older version of the full signature matrix V1, the third incremental signature matrix (V1, v3) needs to be converted so that it is based on the newest full signature matrix V2. Thus, the third incremental signature matrix (V1, v3) is recompiled into the third incremental signature matrix (V2, v3) based on the newly generated full signature matrix V2. During time steps $t_7$ to $t_8$, the second full signature matrix V2 and the third incremental signature matrix (V2, v3) are used for evaluating received streaming events.

At time step $t_8$, a fourth incremental signature matrix (V2, v4) is compiled. This may be initiated by detection of a change in the lookalike audience metadata. During time steps $t_8$ to $t_9$, the second full signature matrix V2 and the fourth incremental signature matrix (V2, v4) are used for evaluating received streaming events.

At time step $t_9$, the audience expansion engine 200 begins to compile the third full signature matrix V3. Until compilation of the third full signature matrix V3 is complete, during time steps t9 to t10, the second full signature matrix V2 and the fourth incremental matrix (V2, v4) are used to evaluate steam events by the audience expansion engine 200.

At time step $t_{10}$, compilation of the third full signature matrix V3 is complete and the third full signature matrix is available for use. During time steps $t_{10}$ to $t_{11}$, the full signature matrix V3 is used to evaluate stream events received at the audience expansion engine 200.

At time step $t_{11}$, a fifth incremental signature matrix (V3, v5) is compiled. This process may be initiated by detection of a change in the metadata of the lookalike audience. During time steps $t_{11}$ to $t_{12}$, the full signature matrix V3 and the incremental signature matrix (V3, v5) are used to evaluate received streaming events.

At time step $t_{12}$, a sixth incremental signature matrix (V3, v6) is compiled. This process may be initiated by detection of a change in the metadata of the lookalike audience. During time steps $t_{11}$ to $t_{12}$, the full signature matrix V3 and the incremental signature matrix (V3, v6) are used to evaluate received streaming events.

Similarity Threshold and Performance Evaluation

To evaluate the modeling performance and to decide the best similarity threshold, the audience expansion engine 200 further includes a simulation tool suite for lookalike audience to monitor the false positive and false negative rates on varying similarity thresholds with different traffic patterns. The overall algorithm used for this performance evaluation can be generalized in Algorithm 3.

```
for features in generated_set_features:
    matchedSegments = signatureMatrix.evaluate(features)
    if len(matchedSegments) > 0: # check false positive
        for seg in matchedSegments:
            false_positive = True
            for user in seg.getUsers( ):
                jaccard = calculate_jaccard_similarity(user.getFeatures( ), features)
                if jaccard >= JACCARD_THRESHOLD:
                    false_positive = False
                    break
            if false_positive:
                ++num_of_false_positive
    if len(segmentList - matchedSegments) > 0:
        for seg in (segmentList - matchedSegments):
            false_negative = False
            for user in seg.getUsers( ):
                jaccard = calculate_jaccard_similarity(user.getFeatures( ), features)
                if jaccard >= JACCARD_THRESHOLD:
                    false_negative = True
                    break
            if false_negative:
                ++num_of_false_negative
```

40

Algorithm 3 permits evaluation of system performance. Actual traffic from the advertising system may be processed to evaluate performance. Either real features from the system or simulated features may be used in the simulation. Results from the simulation are compared with a threshold. The threshold uses false positive and false negative values. If a user is very similar to a lookalike audience, based on the user's features and features of the lookalike audience, but was not added to the lookalike audience, a false negative is determined. If a user is very dissimilar from the lookalike audience but was added to the lookalike audience, a false positive is determined. The false positive rate and the false negative rate are minimized. Intuitively, if the advertiser desires higher reach, they usually can tolerate higher false positive rate with lower false negative rate; Similarly, if advertiser wants better performance, they require lower false positive rate and can thus tolerate more false negative rate. The evaluation results demonstrate that tuning of the parameters of the audience engine (e.g. number of bands B and signature dimensions R) can adjust the false positive rate and false negative rate to meet advertiser's different needs.

FIG. 5 is a diagram illustrating a performance evaluation comparison of lookalike audience expansion modelling used in a real-time ads targeting platform. FIG. 5 includes charts 502, 504 and table 506. Charts 502, 504 of FIG. 5 are graphs of simulation results showing Jaccard similarity on the horizontal axis and percentage of similar users on the vertical axis. Chart 502 illustrates performance when a threshold value is set at 0.35, obtaining more reach for the ad targeting platform. Increasing reach of a target audience corresponds to increasing the numbers in the target audience. Chart 504 illustrates performance when a threshold value is set a 0.65, obtaining better performance. Better performance corresponds to adding to the target audience members who are more likely to click on an ad or convert by making a purchase or other action. Table 506 illustrates simulated false positive rate, false negative rate and found rate per event for different values of Jaccard similarity. Jaccard similarity is a value used for comparing the similarity or difference of two sets of data and has a value between 0.

The simulation results of FIG. 5 permit tuning of parameters of the signature matrices generated by the audience expansion engine 200. By tuning parameters, the reach of the advertising campaign can be adjusted and optimized. At the same time, the performance can be optimized. These optimizations occur by adjusting the lookalike audiences developed using the signature matrices of the audience expansion engine.

From the foregoing, it can be seen that the present embodiments provide an improved system and method for near-real time (NRT) lookalike audience expansion in ads targeting. Embodiments allow advertisers to reach new people who are likely to be interested in the advertised products and services because they are similar to the existing customers. The identification of the new audience members is achieved in a near-real time fashion. Compared to other targeting technologies, near-real time lookalike audience expansion dramatically simplifies the way to reach highly relevant people, significantly improving ads targeting performance and boosting revenue for the advertiser. The disclosed system and method make use of locality sensitive hashing (LSH) to reduce computational cost and memory footprint of the signature matrix. Further, a process of compiling a full signature matrix and supplementing the full signature matrix with incremental signature matrices as lookalike audience segments are added or varied permits operation in real time so that, as a user creates a new segment, that new segment can be applied almost immediately, with minimal delay.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
a processor; and
memory comprising processor-executable instructions that when executed by the processor cause the processor to perform operations comprising:
defining a lookalike audience using one or more models;
receiving, from users, a stream of events;
receiving, via an application program interface (API), seed list information from a user device;
receiving, via the API, lookalike audience information from one or more devices associated with one or more advertisers;
updating the one or more models based upon at least one of the seed list information or the lookalike audience information;
spawning, via one or more database loader threads, one or more pre-compiler threads;
preparing data, via the one or more pre-compiler threads, by (i) fetching seed data, and (ii) storing the seed data in a user profile cache;
signaling, via the one or more pre-compiler threads, one or more signature matrix compiler threads;
building, based upon the seed data and the signaling and via the one or more signature matrix compiler threads, one or more signature matrices;
processing a first event of the stream of events based upon the one or more signature matrices, wherein the first event is associated with a first user; and
determining a degree of similarity between the first user and one or more members of the lookalike audience based upon the processing.

2. The system of claim 1, wherein the operations comprise:
receiving user profile information from a user database, wherein the building is based upon a hash function of at least one of the user profile information or information about one or more lookalike audiences.

3. The system of claim 1, wherein the building comprises:
building a first signature matrix based upon two or more lookalike audiences.

4. The system of claim 3, wherein the operations comprise:
determining a first result based upon a first lookup to the first signature matrix for the first event;
determining a second result based upon a second lookup to a second signature matrix; and
determining the lookalike audience based upon a combination of the first result and the second result.

5. The system of claim 1, wherein the building is based upon k functions for N users.

6. The system of claim 3, wherein the operations comprise:
updating the two or more lookalike audiences.

7. The system of claim 6, wherein the operations comprise:
building a second signature matrix responsive to the updating the two or more lookalike audiences.

8. The system of claim 6, wherein the operations comprise:
building a second signature matrix.

9. A method comprising:
defining, by an audience expansion engine, a lookalike audience using one or more models;
receiving, by the audience expansion engine and from users, a stream of events;
receiving, by the audience expansion engine and via an application program interface (API), seed list information from a user device;
receiving, by the audience expansion engine and via the API, lookalike audience information from one or more devices associated with one or more advertisers;
updating, by the audience expansion engine, the one or more models based upon at least one of the seed list information or the lookalike audience information;
spawning, by the audience expansion engine and via one or more database loader threads, one or more pre-compiler threads;
preparing data, by the audience expansion engine and via the one or more pre-compiler threads, by (i) fetching seed data, and (ii) storing the seed data in a user profile cache;
signaling, by the audience expansion engine and via the one or more pre-compiler threads, one or more signature matrix compiler threads;
building, by the audience expansion engine and based upon the seed data and the signaling and via the one or more signature matrix compiler threads, one or more signature matrices;
processing, by the audience expansion engine, a first event of the stream of events based upon the one or more signature matrices, wherein the first event is associated with a first user; and
determining, by the audience expansion engine, a degree of similarity between the first user and one or more members of the lookalike audience based upon the processing.

10. The method of claim 9, wherein the building comprises:
building, by the audience expansion engine, a first signature matrix based upon two or more lookalike audiences.

11. The method of claim 10, comprising:
determining, by the audience expansion engine, a first result based upon a first lookup to the first signature matrix for the first event;
determining, by the audience expansion engine, a second result based upon a second lookup to a second signature matrix; and
determining, by the audience expansion engine, the lookalike audience based upon a combination of the first result and the second result.

12. The method of claim 10, comprising:
updating, by the audience expansion engine, the two or more lookalike audiences.

13. The method of claim 12, comprising:
building, by the audience expansion engine, a second signature matrix responsive to the updating the two or more lookalike audiences.

14. The method of claim 12, comprising:
building, by the audience expansion engine, a second signature matrix.

15. A non-transitory computer-readable storage medium comprising instructions that when executed by a processor cause the processor to perform operations comprising:
defining a lookalike audience using one or more models;
receiving, from users, a stream of events;
receiving, via an application program interface (API), seed list information from a user device;
receiving, via the API, lookalike audience information from one or more devices associated with one or more advertisers;
updating the one or more models based upon at least one of the seed list information or the lookalike audience information;
spawning, via one or more database loader threads, one or more pre-compiler threads;
preparing data, via the one or more pre-compiler threads, by (i) fetching seed data, and (ii) storing the seed data in a user profile cache;
signaling, via the one or more pre-compiler threads, one or more signature matrix compiler threads;
building, based upon the seed data and the signaling and via the one or more signature matrix compiler threads, one or more signature matrices;
processing a first event of the stream of events based upon the one or more signature matrices, wherein the first event is associated with a first user; and
determining a degree of similarity between the first user and one or more members of the lookalike audience based upon the processing.

16. The non-transitory computer-readable storage medium of claim 15, wherein the building comprises:
building a first signature matrix based upon two or more lookalike audiences.

17. The non-transitory computer-readable storage medium of claim 16, the operations comprising:
determining a first result based upon a first lookup to the first signature matrix for the first event;
determining a second result based upon a second lookup to a second signature matrix; and
determining the lookalike audience based upon a combination of the first result and the second result.

18. The non-transitory computer-readable storage medium of claim 16, the operations comprising:
updating the two or more lookalike audiences.

19. The non-transitory computer-readable storage medium of claim 18, the operations comprising:
   building a second signature matrix responsive to the updating the two or more lookalike audiences.

20. The non-transitory computer-readable storage medium of claim 18, the operations comprising:
   building a second signature matrix.

\* \* \* \* \*